US008680411B2

(12) United States Patent
Nakamura et al.

(10) Patent No.: US 8,680,411 B2
(45) Date of Patent: Mar. 25, 2014

(54) ON-VEHICLE LEVER SWITCH

(75) Inventors: Takeo Nakamura, Fukui (JP);
Masahiko Fujita, Fukui (JP); Daiki Kaburagi, Fukui (JP)

(73) Assignee: Panasonic Corporation, Osaka (JP)

( * ) Notice: Subject to any disclaimer, the term of this patent is extended or adjusted under 35 U.S.C. 154(b) by 251 days.

(21) Appl. No.: 13/234,415

(22) Filed: Sep. 16, 2011

(65) Prior Publication Data

US 2012/0067710 A1 Mar. 22, 2012

(30) Foreign Application Priority Data

Sep. 22, 2010 (JP) ................................. 2010-211772

(51) Int. Cl.
*H01H 9/00* (2006.01)
(52) U.S. Cl.
USPC .................................... 200/61.54; 200/61.27
(58) Field of Classification Search
USPC ............. 200/61.54–61.57, 61.27–61.38, 335, 200/336, 187, 345, 500, 501, 300; 439/465
See application file for complete search history.

(56) References Cited

U.S. PATENT DOCUMENTS

| 5,670,765 | A | * | 9/1997 | Yokoyama et al. | ......... 200/61.54 |
| 5,780,794 | A | * | 7/1998 | Uchiyama et al. | ......... 200/61.54 |
| 7,294,022 | B1 | * | 11/2007 | Cheng et al. | ................... 439/668 |
| 2003/0019731 | A1 | * | 1/2003 | Liburdi | ....................... 200/61.54 |
| 2003/0098223 | A1 | * | 5/2003 | Uchiyama et al. | ......... 200/61.54 |
| 2003/0155223 | A1 | | 8/2003 | Nakade et al. | |
| 2008/0029370 | A1 | * | 2/2008 | Reischl et al. | ............. 200/61.54 |

FOREIGN PATENT DOCUMENTS

| JP | 2003-217405 | 7/2003 |
| JP | 2009-140773 | 6/2009 |

* cited by examiner

*Primary Examiner* — Renee Luebke
*Assistant Examiner* — Harshad Patel
(74) *Attorney, Agent, or Firm* — Panasonic Patent Center

(57) ABSTRACT

An on-vehicle lever switch includes a main body portion, a lever body, and a switch contact. The lever body includes a knob rockably held by the main body portion and protruding outward, a drive shaft extending in the direction along which the knob protrudes and being rotatably held in the knob, and a rotational operation portion fixed to the drive shaft. The switch contact is disposed at the main body portion, and carries out electrical connection by rocking or rotating of the lever body. The knob can be divided into two portions, a first knob portion and a second knob portion, along the extending direction. The first knob portion and the second knob portion are coupled to each other by a first member provided in the inner part of the first knob portion and a second member provided in the inner part of the second knob portion.

6 Claims, 7 Drawing Sheets

ON-VEHICLE LEVER SWITCH

BACKGROUND OF THE INVENTION

1. Field of the Invention

The present invention relates to an on-vehicle lever switch mainly mounted in the vicinity of a steering wheel of an automobile for use in operating a wiper, a turn signal lamp, and the like.

2. Background Art

An on-vehicle lever switch is mounted in the vicinity of a steering wheel of an automobile. When a driver operates the lever switch, an operation of a wiper is changed or a turn signal lamp blinks.

FIG. 7 is a sectional view of a conventional on-vehicle lever switch. Cylindrical lever main body 51 made of insulating resin has opening 51A in the longitudinal direction on the side wall thereof.

An end portion of columnar shaft portion 52A in the center of switch 52 that is inserted through shaft holder 51B of lever main body 51 is fixed by fixing ring 52B, and switch 52 is mounted on tip side 60 of lever main body 51. Operation knob 53 is fixed on the outer periphery of rotational operation switch 52, and rotationally movably mounted on the tip of lever main body 51. Operation knob 53 is made of cap-shaped insulating resin.

One end of lead wire 54 is disposed inside lever main body 51, and connected to switch 52. The other end of lead wire 54 is connected to connector 54A, and extends from foot side 70 of lever main body 51. Opening 51A is covered with cover 55 made of insulating resin. Both ends of cover 55 are attached to lever main body 51 with screws. Thus, on-vehicle lever switch 56 is configured.

The following is a description of how to assemble on-vehicle lever switch 56. Shaft portion 52A of switch 52 to which lead wire 54 is connected is inserted through shaft holder 51B from tip side 60 of lever main body 51, fixing ring 52B is inserted into an end portion of shaft portion 52A from opening 51A, and shaft portion 52A is fixed to shaft holder 51B. Next, operation knob 53 is rotationally movably fixed on the outer periphery of switch 52 mounted on the tip of lever main body 51. Lead wire 54 is inserted and housed in opening 51A, and connector 54A is allowed to extend from foot side 70 of lever main body 51.

Next, opening 51A is covered with cover 55, and both ends of cover 55 are fixed on lever main body 51 with screws. In the way as mentioned above, on-vehicle lever switch 56 is assembled.

On-vehicle lever switch 56 is mounted on a predetermined position of a switch unit main body (not shown), and connector 54A of lead wire 54 is connected to an electronic circuit (not shown) in the switch unit main body.

In the above-mentioned configuration, when a driver operates to rotate operation knob 53 on the tip of on-vehicle lever switch 56, electrical connection is carried out by switch 52, and a predetermined signal is output to a switch unit main body via lead wire 54. In this way, for example, an operation of a wiper is changed.

However, in on-vehicle lever switch 56, opening 51A, which is provided in order to fix switch 52 or to house lead wire 54, is covered with cover 55. Then, both ends of cover 55 are attached to lever main body 51 with screws, and accordingly it takes a long time to assemble on-vehicle lever switch 56.

SUMMARY

An on-vehicle lever switch includes a main body portion, a lever body, and a switch contact. The lever body includes a knob rockably held by the main body portion and protruding outward, a drive shaft extending in the direction along which the knob protrudes and being rotatably held in the knob, and a rotational operation portion fixed to the drive shaft. The switch contact is disposed at the main body portion, and carries out electrical connection by rocking or rotating the lever body. The knob can be divided into two portions, a first knob portion and a second knob portion, along the extending direction. The first knob portion and the second knob portion are coupled to each other by a first member provided in the inner part of the first knob portion and a second member provided in the inner part of the second knob portion.

DETAILED DESCRIPTION OF THE PREFERRED EMBODIMENTS

First Embodiment

Figure 1:
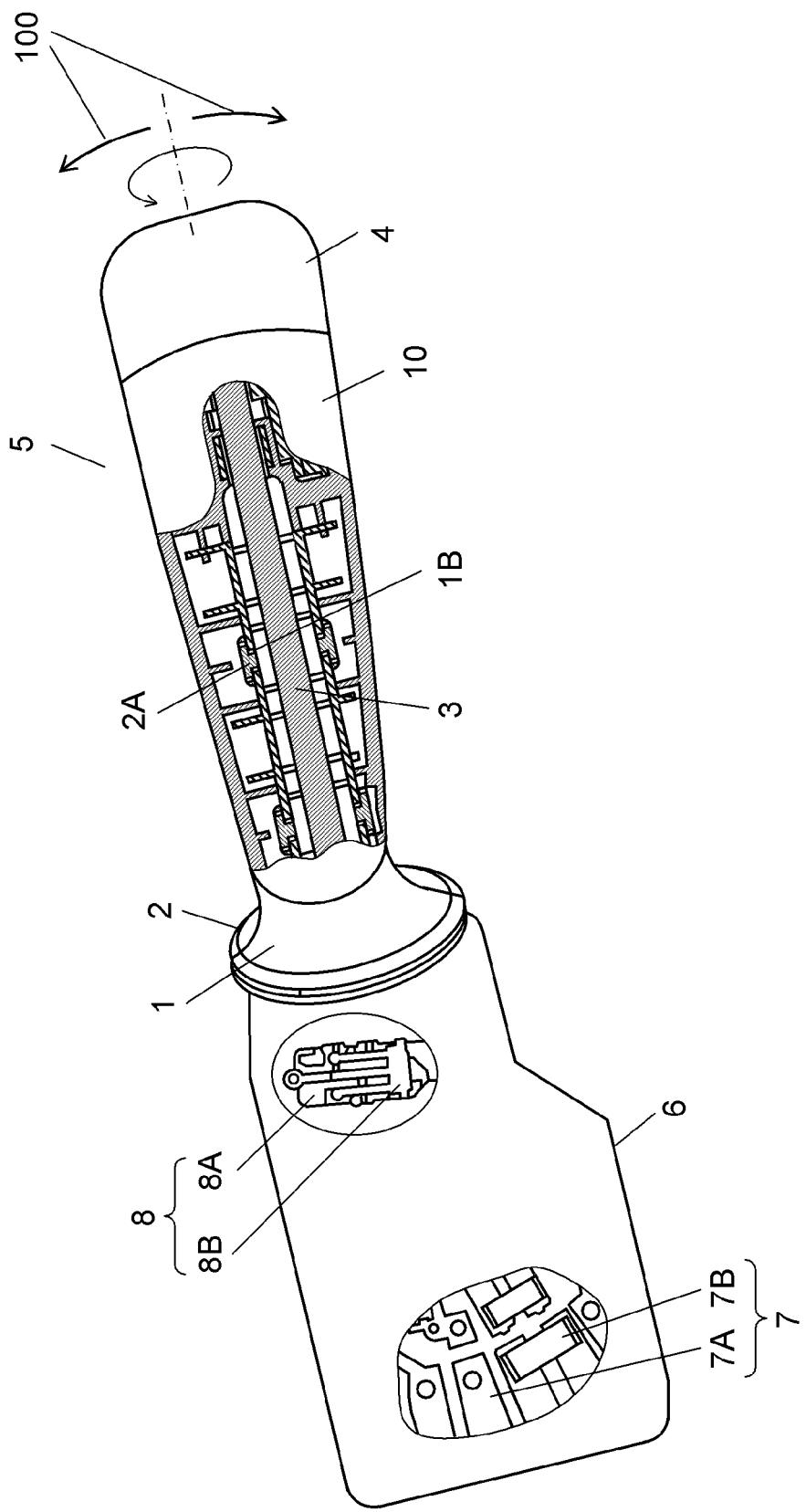
FIG. 1 is a partially cutaway perspective view of an on-vehicle lever switch in accordance with a first embodiment.
Figure 2:
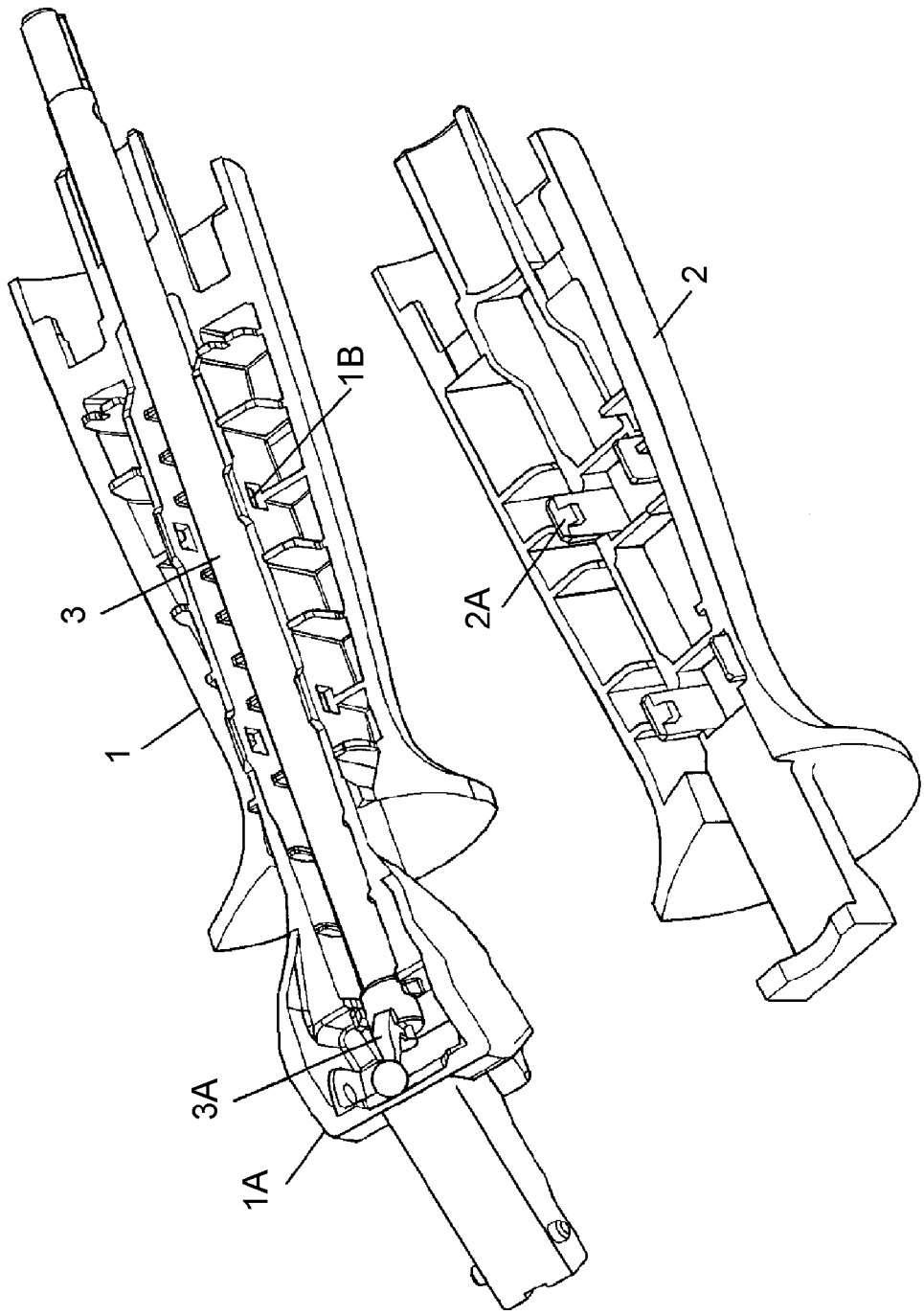
FIG. 2 is an exploded perspective view of a main part of the on-vehicle lever switch in accordance with the first embodiment.
Figure 3:
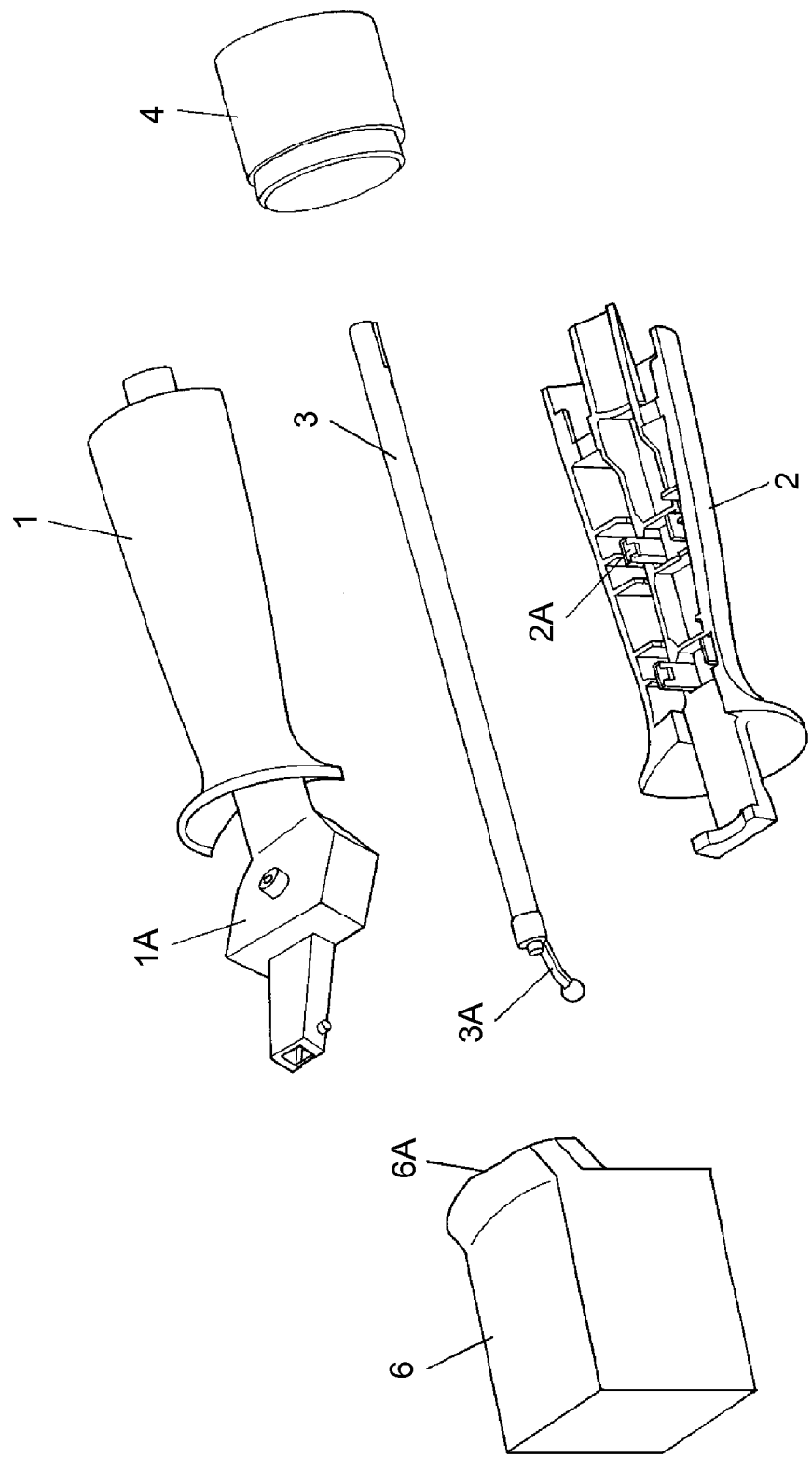
FIG. 3 is an exploded perspective view of the on-vehicle lever switch in accordance with the first embodiment.

FIG. 1 is a partially cutaway perspective view of an on-vehicle lever switch in accordance with a first embodiment. FIG. 2 is an exploded perspective view of a main part of the on-vehicle lever switch in accordance with this embodiment. FIG. 3 is an exploded perspective view of the on-vehicle lever switch in accordance with this embodiment.

An on-vehicle lever switch includes main body portion 6, lever body 5 and switch contacts 7 and 8. Lever body 5 includes knob 10 rockably held by main body portion 6 and protruding outward, drive shaft 3 extending in the direction along which knob 10 protrudes and rotatably held in knob 10, and rotational operation portion 4 fixed to drive shaft 3. Switch contacts 7 and 8 are disposed at main body portion 6 and carry out electrical connection with the rocking or the rotating of lever body 5. Knob 10 can be divided into two portions, first knob portion 1 and second knob portion 2, along the extending direction. Engagement portion 1B (first member) provided in the inner part of first knob portion 1 and locking portion 2A (second member) provided in the inner part of second knob portion 2 are locked into each other, and thereby first knob portion 1 and second knob portion 2 are coupled to each other.

As shown in FIGS. 2 and 3, first knob portion 1 has a semi-cylindrical upper surface and rocking drive portion 1A protruding from the rear part thereof, and is made of insulating resin such as polyamide. Second knob portion 2 has a semi-cylindrical lower surface and is made of insulating resin such as polyamide. Drive shaft 3 is made of insulating resin such as polyamide. Columnar drive shaft 3 is rotatably held between the lower surface of first knob portion 1 and the upper surface of second knob portion 2. The lower surface of first knob portion 1 and the upper surface of second knob portion 2 are brought into contact with each other.

A plurality of locking portions 2A each having a locking protrusion inside thereof protrudes upward from second knob portion 2. A plurality of engagement portions 1B, each having a hole, is formed on the lower surface of first knob portion 1. Each locking portion 2A is locked into its facing engagement portion 1B, and thereby first knob portion 1 and second knob portion 2 are coupled to each other.

Cylindrical rotational operation portion 4 that opens in the rear part is fastened to the front end of drive shaft 3 and is rotatably mounted on the front end portion of the coupled first and second knob portions 1 and 2. Lever body 5 is formed of drive shaft 3, first knob portion 1 and second knob portion 2, which are coupled to each other with drive shaft 3 sandwiched therebetween, and rotational operation portion 4.

Furthermore, rocking drive portion 1A of lever body 5 is attached to opening 6A in box-like main body portion 6. Drive portion 1A rocks in the right and left direction (in the direction shown by arrow 100 in FIG. 1) while a click feeling is given for each predetermined angle by a click mechanism (not shown). That is to say, lever body 5 is mounted on main body portion 6 in a state in which first knob portion 1 and second knob portion 2 protrude from opening 6A.

Fixed contact point 7A is formed on the upper surface of a wiring board (not shown) placed in main body portion 6. Movable contact piece 7B is fastened to a sliding member (not shown) that slides in linkage with a rocking operation of lever body 5 in the right and left direction of rocking drive portion 1A (in the direction shown by arrow 100 in FIG. 1). That is to say, switch contact 7 composed of fixed contact point 7A and movable contact piece 7B is provided in main body portion 6.

Furthermore, fixed contact point 8A is formed on the upper surface of a wiring board (not shown) placed in main body portion 6. Movable contact piece 8B is fastened to a sliding member (not shown) that slides in linkage with a rotation operation of drive shaft 3. That is to say, switch contact 8 composed of fixed contact point 8A and movable contact piece 8B is provided in main body portion 6.

With the rocking operation in the right and left direction of lever body 5, electrical connection of switch contact 7 is carried out via rocking drive portion 1A. Meanwhile, with the rotation operation of rotational operation portion 4, electrical connection of switch contact 8 is carried out via rotation drive portion 3A shown in FIGS. 2 and 3. Thus, an on-vehicle lever switch is configured.

An on-vehicle lever switch is mounted in front of a driver's seat in an automobile in such a manner that lever body 5 protrudes in the lower part of a steering wheel (not shown). Then, a lead wire (not shown) and the like connected to the wiring board is electrically connected to an electronic circuit of a vehicle (not shown).

In the configuration mentioned above, when lever body 5 is operated to rock in the right and left direction, in response to this, electrical connection of switch contact 7 is carried out. Accordingly, for example, an operation of a front wiper (not shown) is switched from a stopped state to predetermined operation states including an intermittent operation that operates in the interval of a predetermined period of time, a normal operation, a high-speed operation, a single action operation, or the like.

Furthermore, when rotational operation portion 4 is operated to rotate, electrical connection of switch contact 8 is accordingly carried out. For example, an operation of a rear wiper is switched from a stopped state to an intermittent operation or a normal operation.

According to this embodiment, first knob portion 1 is coupled to second knob portion 2 by allowing drive shaft 3 to be held in first knob portion 1, and locking portion 2A to be locked into engagement portion 1B. Then, rotational operation portion 4 is rotatably mounted on the front end portion of the coupled first and second knob portions 1 and 2, and thereby lever body 5 is formed. Thereafter, rocking drive portion 1A of lever body 5 is attached to opening 6A in main body portion 6. In this way, by allowing locking portion 2A to be locked into engagement portion 1B, first knob portion 1 and second knob portion 2 are coupled to each other. Therefore, unlike a conventional configuration, a screwing operation with screws is not necessary. Thus, an on-vehicle lever switch can be assembled in a short time.

Second Embodiment

Figure 4:
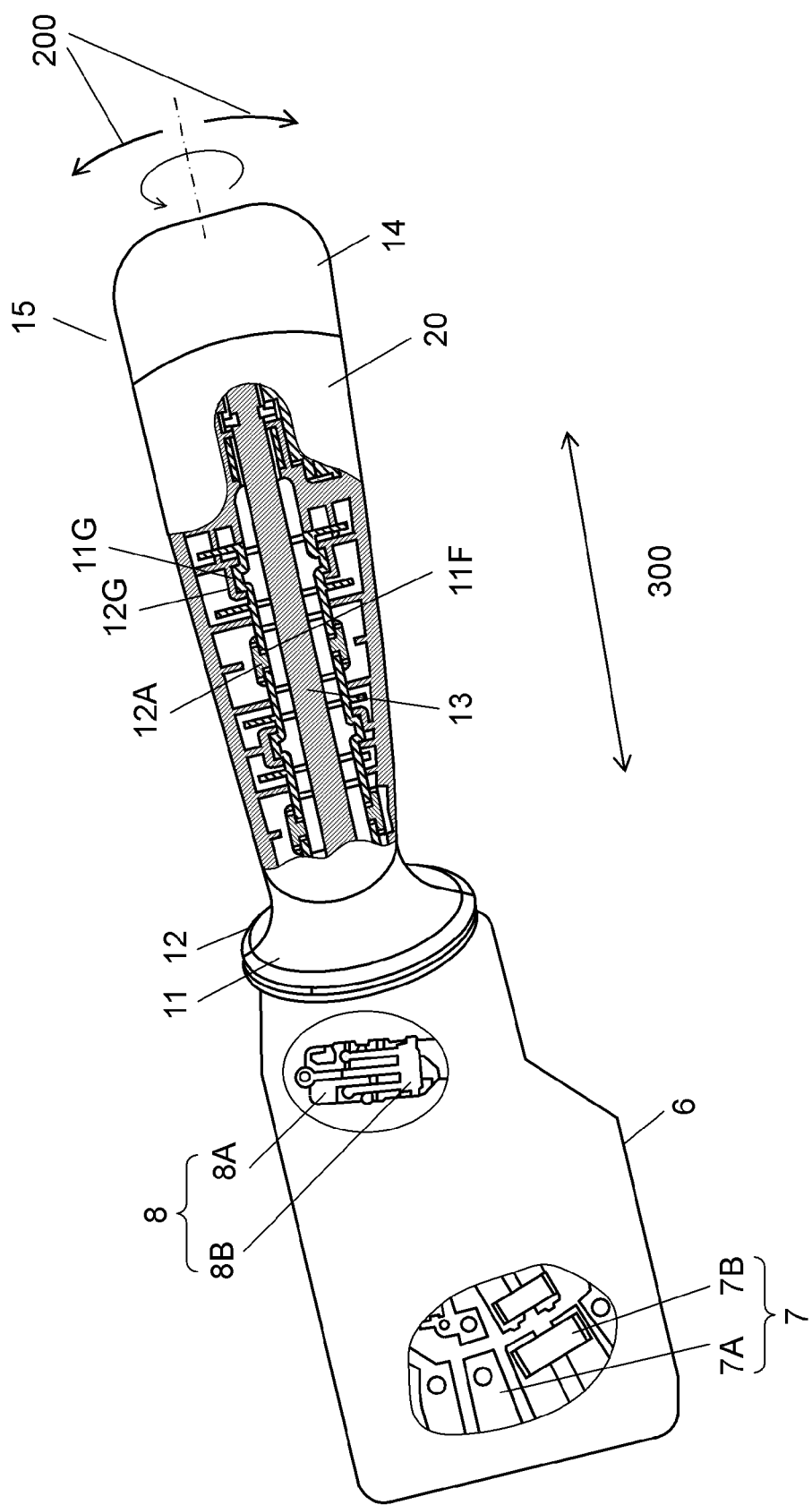
FIG. 4 is a partially cutaway perspective view of an on-vehicle lever switch in accordance with a second embodiment.
Figure 5:
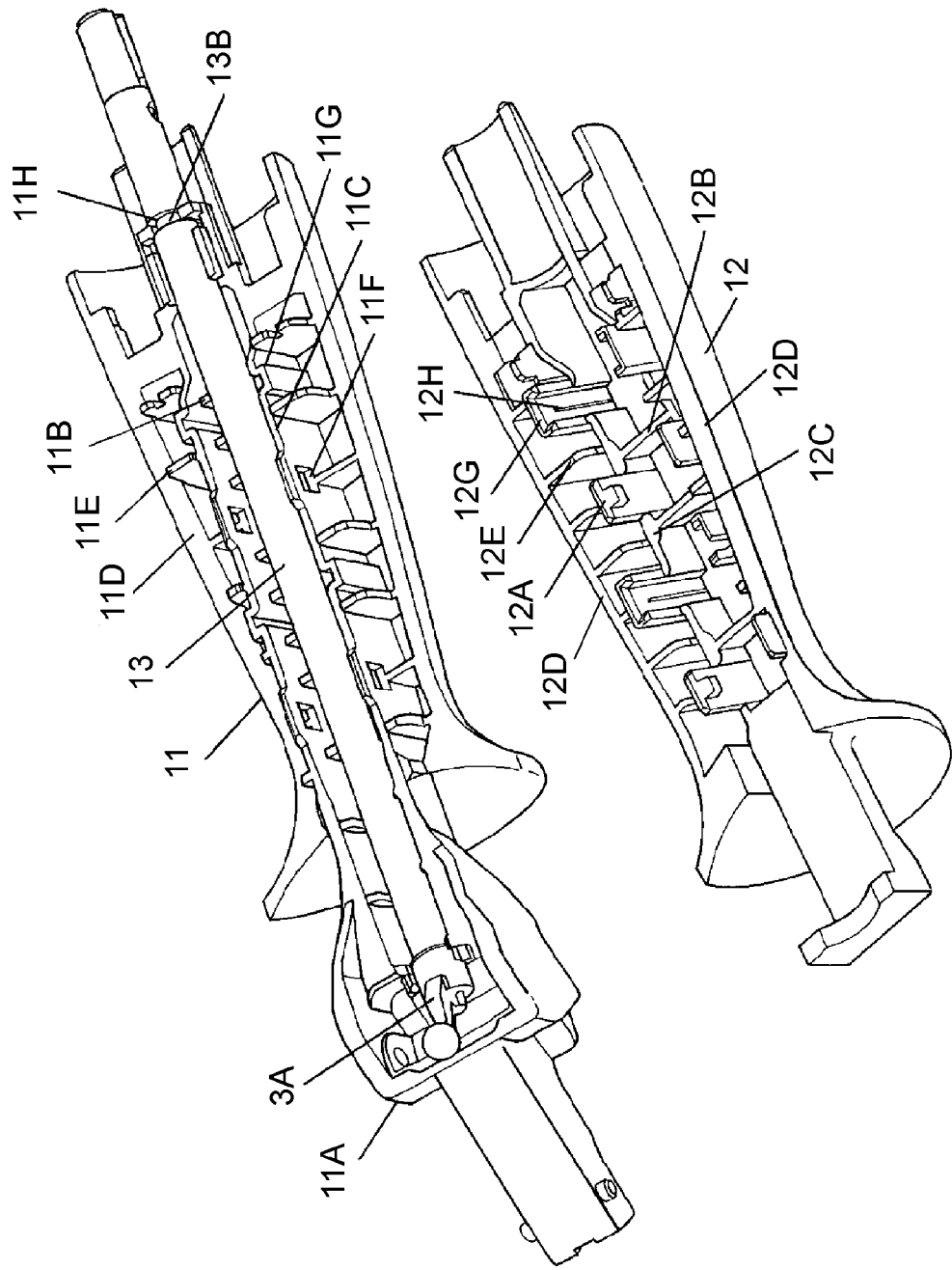
FIG. 5 is an exploded perspective view of a main part of the on-vehicle lever switch in accordance with the second embodiment.
Figure 6:
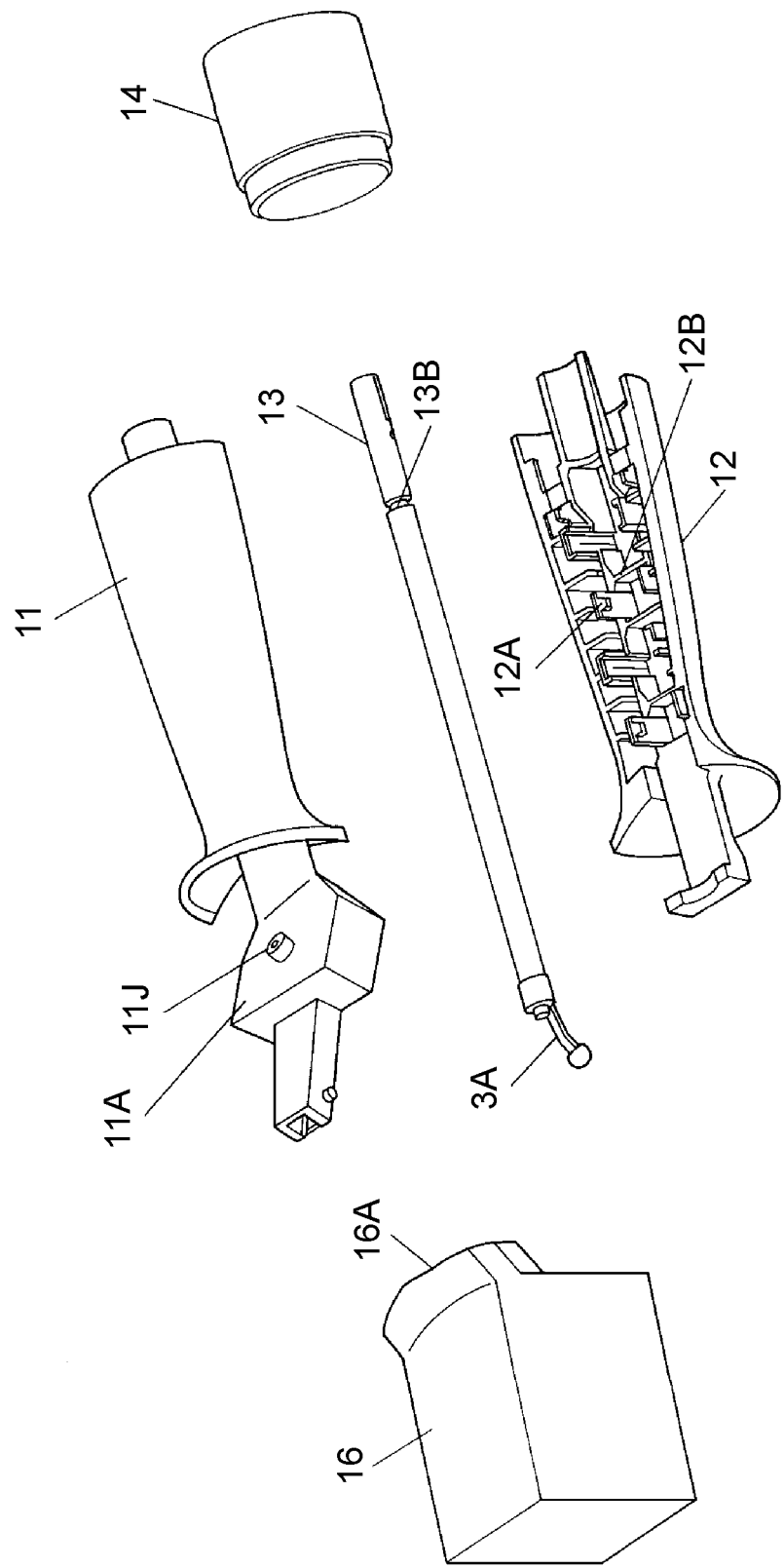
FIG. 6 is an exploded perspective view of the on-vehicle lever switch in accordance with the second embodiment.
Figure 7:
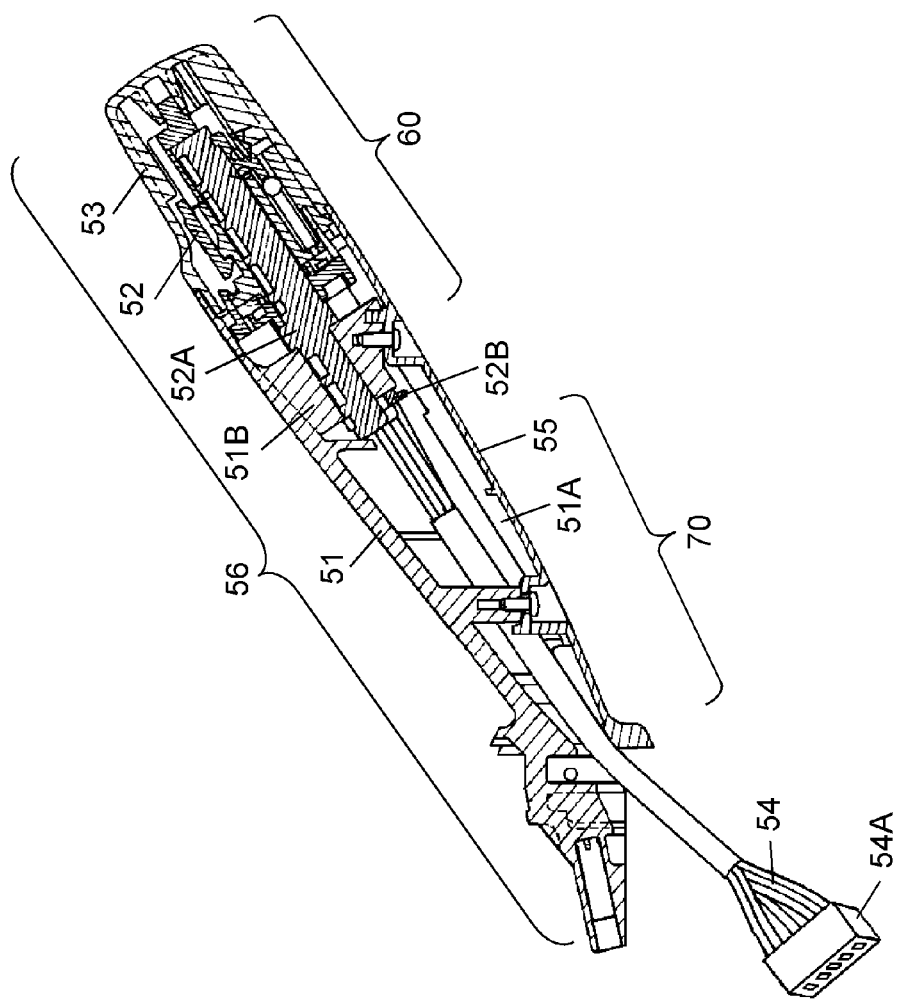
FIG. 7 is a sectional view of a conventional on-vehicle lever switch.

FIG. 4 is a partially cutaway perspective view of an on-vehicle lever switch in accordance with a second embodiment. FIG. 5 is an exploded perspective view of a main part of the on-vehicle lever switch in accordance with this embodiment. FIG. 6 is an exploded perspective view of the on-vehicle lever switch in accordance with this embodiment.

This embodiment differs from the first embodiment in a structure of knob 20 of lever body 15. In short, engagement portion 11F provided in the inner part of first knob portion 11 and locking portion 12A provided in the inner part of second knob portion 12 are locked into each other, and projection portion 11G provided in the inner part of first knob portion 11 and recess portion 12G provided in the inner part of second knob portion 12 are press-fitted in each other. When engagement portion 11F is a first member, locking portion 12A corresponds to a second member. When projection portion 11G is a first member, recess portion 12G corresponds to a second member. The other configurations are the same as those in the first embodiment.

As shown in FIGS. 5 and 6, first knob portion 11 has a semi-cylindrical upper surface, has rocking drive portion 11A protruding from the rear part thereof, and is made of insulating resin such as polyamide. Second knob portion 12 has a semi-cylindrical lower surface and is made of insulating resin such as polyamide. Drive shaft 13 has a columnar shape and is made of insulating resin such as polyamide. Drive shaft 13 is rotatably held between the lower surface of first knob portion 11 and the upper surface of second knob portion 12.

First knob portion 11 is provided with control rib 1111 having a semicircular cutaway portion. Groove portion 13B in the front part of drive shaft 13 is fitted into control rib 1111. As a result, the position in the longitudinal direction of drive shaft 13 is controlled, and movement or a backlash in the longitudinal direction is small. Note here that control rib 1111 may be formed in second knob portion 12. Furthermore, this configuration may be applied to the first embodiment.

On the lower surface of first knob portion 11, a plurality of middle ribs 11B are formed in the upper side in the longitudinal direction of drive shaft 13. On both sides of middle ribs 11B, inner wall portions 11C are formed extending along the longitudinal direction.

A plurality of outer ribs 11E are formed between the outer side of inner wall portion 11C and outer peripheral portion 11D, and a plurality of pairs of engagement portions 11F, each having a hole, are placed in the predetermined positions in the longitudinal direction of each inner wall portion 11C. A plurality of pairs of belt-like projection portions 11G protruding outward in a substantially square C shape are placed alternately with respect to engagement portion 11F in the longitudinal direction.

On the upper surface of second knob portion 12, a plurality of middle ribs 12B are formed in the position under the lower side of drive shaft 13. The inner wall portions 12C are formed along the longitudinal direction of both sides of middle ribs 12B. A plurality of outer ribs 12E are formed between the outer side of inner wall portion 12C and outer peripheral portion 12D.

In a predetermined position in the longitudinal direction of each inner wall portion 12C, a plurality of pairs of locking portions 12A each having a locking protrusion at the inside of the tip thereof are placed in such a manner that they protrude upward from the upper end of outer peripheral portion 12D. Furthermore, a plurality of pairs of belt-like recess portions 12G, which are depressed outward in substantially square C shape, extend upward and are placed alternately with respect to locking portions 12A in the longitudinal direction.

It is preferable that an inner surface facing drive shaft 13 at the inside of recess portion 12G and both side surfaces thereof are provided with linear protrusion portions 1211 extending in the vertical direction.

Locking portion 12A of second knob portion 12 is locked into facing engagement portion 11F. Projection portion 11G is press-fitted into recess portion 12G. As a result, first knob portion 11 and second knob portion 12 are coupled with each other in a state in which the lower surface of first knob portion 11 and the upper surface of second knob portion 12 are brought into contact with each other.

Projection portion 11G is press-fitted into recess portion 12G while protrusion portions 1211 on the inner surface and both side surfaces of recess portion 12G are deformed and brought into press-contact with the outer surface and both side surfaces of the corresponding projection portion 11G. With the formation of protrusion portion 1211, the strength in press-fitting is increased.

In other words, the three inner peripheral surfaces, that is, the inner surface and both side surfaces of recess portion 12G are press-fitted into the outer peripheral surfaces of the outer surface and both side surfaces of projection portion 11G in a predetermined length in the vertical direction. Therefore, a backlash or displacement does not occur between recess portion 12G and projection portion 11G, and thus projection portion 11G does not come off in the vertical direction.

Rotational operation portion 14 has an opening in the rear portion and a cylinder shape, and is made of insulating resin such as polyamide. Rotational operation portion 14 is fastened to the front end of drive shaft 13, and thereby rotatably mounted on the front end of the coupled first and second knob portions 11 and 12. As a result, lever body 15 is formed of drive shaft 13, first knob portion 11 and second knob portion 12 sandwiching drive shaft 13 therebetween, and rotational operation portion 14.

Main body portion 16 has a box-like shape provided with opening 16A. Shaft portion 11J of rocking drive portion 11A is pivotally supported by a pivotally supporting portion (not shown) at the inside of the facing main body portion 16. Rocking drive portion 11A rocks while a click feeling is given for each predetermined angle by a click mechanism (not shown) provided between the rear end portion of rocking drive portion 11A and the inside of main body portion 16. That is to say, lever body 15 is mounted on main body portion 16 in such a manner that rotational operation portion 14 or the front parts of first knob portion 11 and front part of second knob portion 12 protrude outward from opening 16A.

Locking portion 12A is engaged with engagement portion 11F, and thereby first knob portion 11 is locked into second knob portion 12. Thus, belt-like projection portion 11G is press-fitted into belt-like recess portion 12G in the predetermined length in the vertical direction. Consequently, in a state in which lever body 15 is assembled, even if shock by drop or relatively large force such as torsion is applied during, for example, handling such as storage or transport, or mounting on main body portion 16, a backlash or displacement does not occur between first knob portion 11 and second knob portion 12. As a result, first knob portion 11 and second knob portion 12 are not easily separated from each other, and therefore a gap does not easily occur between them.

A pair of press-fitting portions each composed of projection portion 11G and recess portion 12G are placed in two portions in the front part and rear part in the longitudinal direction of drive shaft 13 of lever body 15. Therefore, generation of a backlash or displacement is suppressed in both directions, that is, in the back and forth direction (in the direction shown by arrow 300 in FIG. 4) and in the right and left direction (in the direction shown by arrow 200 in FIG. 4), and thus, coupling between first knob portion 11 and second knob portion 12 becomes stronger.

In this way, in this embodiment, belt-like projection portion 11G is provided in the inner part of first knob portion 11, and belt-like recess portion 12G to be press-fitted to projection portion 11G is provided in the inner part of second knob portion 12. By coupling first knob portion 11 and second knob portion 12 to each other by allowing projection portion 11G to be press-fitted into recess portion 12G, a backlash or displacement due to shock by drop or torsion does not easily occur between first knob portion 11 and second knob portion 12. Thus, first knob portion 11 and second knob portion 12 are not easily separated from each other. As a result, it is possible to manufacture an on-vehicle lever switch in which first knob portion 11 and second knob portion 12 are firmly coupled to each other, and a gap therebetween does not easily occur. Furthermore, unlike a conventional method, since a screwing operation with screws is not necessary, an on-vehicle lever switch can be assembled in a short time.

In the above-description, first knob portion 11 in the upper side is provided with projection portion 11G, and second knob portion 12 in the lower side is provided with recess portion 12G. However, first knob portion 11 may be provided with a recess portion and the second knob may be provided with the projection portion. Furthermore, first knob portion 11 and second knob portion 12 may be provided with projection portion 11G and recess portion 12G.

Furthermore, in the above description, two pairs of press-fitting portions each composed of belt-like projection portion 11G and recess portion 12G are provided in first knob portion 11 and second knob portion 12 in total four portions in the front part and rear part of drive shaft 13 such that they sandwich drive shaft 13 therebetween. However, a plurality of projection portions 11G and recess portions 12G may be provided in the left and right sides alternately in the longitudinal direction of drive shaft 13, for example, and they may be provided in, for example, the left side of the front part, the right side of the middle part and the left side of the rear part of drive shaft 13.

Furthermore, in addition to projection portion 11G and recess portion 12G to be press-fitted to each other, a projection press-contact portion (not shown) and a recess press-contact portion (not shown) which are not to be press-fitted into each other but to be only press-contacted may be provided. For example, projection portion 11G is provided in a middle part of first knob portion 11, and a projection press-contact portion is provided in the front and rear parts of projection portion 11G. Furthermore, recess portion 12G is provided in a middle part of second knob portion 12, and recess press-contact portions are provided in the front and rear parts of recess portion 12G. Then, projection portion 11G and recess portion 12G are press-fitted to each other and a projection press-contact portion and a recess press-contact portion are brought into press contact with each other. With such a structure, it is possible to further prevent the knob portion and the second knob portion from being displaced or distorted. Thus, according to the shape or size of lever body 15, a press-fitting portion can be appropriately placed.

As mentioned above, the on-vehicle lever switch in accordance with this embodiment can be made to have a simple configuration in which first knob portion 11 and second knob portion 12 can be firmly coupled to each other and a gap is not easily generated.

Furthermore, according to this embodiment, first knob portion 11 and second knob portion 12 are coupled to each other by allowing drive shaft 13 to be held by first knob portion 11, locking portion 12A to be locked in engagement portion 11F, and projection portion 11G to be press-fitted into recess portion 12G. Then, rotational operation portion 14 is rotatably mounted on the front end portion of the coupled first and second knob portions 11 and 12, and thereby lever body 15 is formed. Thereafter, rocking drive portion 11A of lever body 15 is attached to opening 16A in main body portion 16.

Thus, first knob portion 11 and second knob portion 12 are coupled to each other by the locking of locking portion 2A and engagement portion 1B as well as the press-fitting of projection portion 11G and recess portion 12G. Therefore, unlike a conventional method, a screwing operation with screws is not necessary and thus an on-vehicle lever switch can be assembled in a short time. Therefore, a switch useful for an on-vehicle lever switch that is mounted in the vicinity of a steering wheel of an automobile is provided.

What is claimed is:

1. A lever switch comprising:
   a main body portion;
   a lever body including:
      a knob rockably held by the main body portion and protruding outward;
      a drive shaft extending in a direction along which the knob protrudes and being rotatably held in the knob; and
      a rotational operation portion fixed to the drive shaft; and
   a switch contact disposed at a position in the main body portion where electrical connection is carried out by rocking or rotating of the lever body,
   wherein the knob can be divided into two portions, a first knob portion and a second knob portion, along the extending direction,
   the first knob portion and the second knob portion are coupled to each other by a first member provided in an inner part of the first knob portion and a second member provided in an inner part of the second knob portion,
   the first member includes a projection portion, and the second member includes a recess portion to be press-fitted to the projection portion, and
   protrusion portions are formed on an inner surface and both side surfaces of the recess portion.

2. The lever switch of claim 1, wherein the lever switch is adapted to be mounted in a vicinity of a steering wheel of an automobile.

3. The lever switch of claim 1, wherein the first member further includes an engagement portion, and the second member further includes a protruding locking portion to be locked into the engagement portion.

4. A lever switch comprising:
   a main body portion;
   a lever body including:
      a knob rockably held by the main body portion and protruding outward;
      a drive shaft extending in a direction along which the knob protrudes and being rotatably held in the knob; and
      a rotational operation portion fixed to the drive shaft; and
   a switch contact disposed at a position in the main body portion where electrical connection is carried out by rocking or rotating of the lever body,
   wherein the knob can be divided into two portions, a first knob portion and a second knob portion, along the extending direction,
   the first knob portion and the second knob portion are coupled to each other by a first member provided in an inner part of the first knob portion and a second member provided in an inner part of the second knob portion,
   the drive shaft includes a groove portion, and
   at least one of the first knob portion and the second knob portion is provided with a control rib having a semicircular cutaway portion, and the groove portion of the drive shaft is disposed onto the control rib.

5. The lever switch of claim 4, wherein the lever switch is adapted to be mounted in a vicinity of a steering wheel of an automobile.

6. The lever switch of claim 4, wherein the first member further includes a projection portion, and the second member further includes a recess portion to be press-fitted to the projection portion.

* * * * *